(12) United States Patent
Petterson et al.

(10) Patent No.: US 8,011,321 B2
(45) Date of Patent: Sep. 6, 2011

(54) TEATCUP LINER

(75) Inventors: Torbjorn Petterson, Gnesta (SE); Jan Kassibrahim, Stockholm (SE)

(73) Assignee: DeLaval Holding AB, Tumba (SE)

( * ) Notice: Subject to any disclaimer, the term of this patent is extended or adjusted under 35 U.S.C. 154(b) by 96 days.

(21) Appl. No.: 12/444,064

(22) PCT Filed: Oct. 2, 2007

(86) PCT No.: PCT/SE2007/050695
§ 371 (c)(1), (2), (4) Date: Apr. 2, 2009

(87) PCT Pub. No.: WO2008/041935
PCT Pub. Date: Apr. 10, 2008

(65) Prior Publication Data
US 2010/0089326 A1    Apr. 15, 2010

(30) Foreign Application Priority Data
Oct. 2, 2006    (SE) .................................... 0602051

(51) Int. Cl.
*A01J 5/04*    (2006.01)
(52) U.S. Cl. .................................................. 119/14.49
(58) Field of Classification Search ............... 119/14.22, 119/14.27, 14.47–14.53; 24/20 R, 20 TT, 24/22; 29/235
See application file for complete search history.

(56) References Cited

U.S. PATENT DOCUMENTS

| 1,024,847 A | * | 4/1912 | Gillies | 119/14.49 |
| 2,502,956 A | * | 4/1950 | Jansson | 119/14.52 |
| 4,263,912 A | * | 4/1981 | Adams | 604/75 |
| 4,530,307 A | * | 7/1985 | Thompson | 119/14.49 |
| 4,543,691 A | * | 10/1985 | Calmettes | 24/20 R |
| 4,651,676 A | * | 3/1987 | Kupres | 119/14.47 |
| 4,924,809 A | * | 5/1990 | Verbrugge | 119/14.02 |
| 4,964,368 A | * | 10/1990 | Ball et al. | 119/14.49 |
| 5,493,995 A | * | 2/1996 | Chowdhury | 119/14.54 |
| 6,058,879 A | * | 5/2000 | Miefalk | 119/14.47 |
| 7,093,808 B2 | * | 8/2006 | Yuzuriha et al. | 248/62 |
| 7,350,478 B2 | * | 4/2008 | Fernandez | 119/14.47 |
| 7,650,854 B2 | * | 1/2010 | Petterson et al. | 119/14.49 |

FOREIGN PATENT DOCUMENTS

| DE | 33 37 114 | 9/1984 |
| EP | 0 717 927 | 6/1996 |
| WO | 2005/120216 | 2/2005 |

OTHER PUBLICATIONS

International Search Report dated Jan. 3, 2008, from corresponding PCT application.

* cited by examiner

*Primary Examiner* — Rob Swiatek
*Assistant Examiner* — Ebony Evans
(74) *Attorney, Agent, or Firm* — Young & Thompson

(57) ABSTRACT

A teatcup liner adapted to be mounted in a shell to form a teatcup to be applied to a teat of an animal, and a method of mounting a teatcup liner. The liner defines an inner space for receiving the teat and a longitudinal center axis. The liner has a head portion, a tubular barrel portion and, a tubular lower portion defining a milk channel having a cross-section area perpendicular to the center axis. The tubular lower portion has a primary engagement member to be engaged by a secondary engagement member of the shell. The liner includes a grip member extending from the tubular lower portion to be gripped by an operator when the liner is to be mounted. The grip member defines a force application zone on which a pulling force is to be applied and which seen along the center axis is located within the cross-section area.

23 Claims, 7 Drawing Sheets

TEATCUP LINER

BACKGROUND OF THE INVENTION AND PRIOR ART

Figure 1:
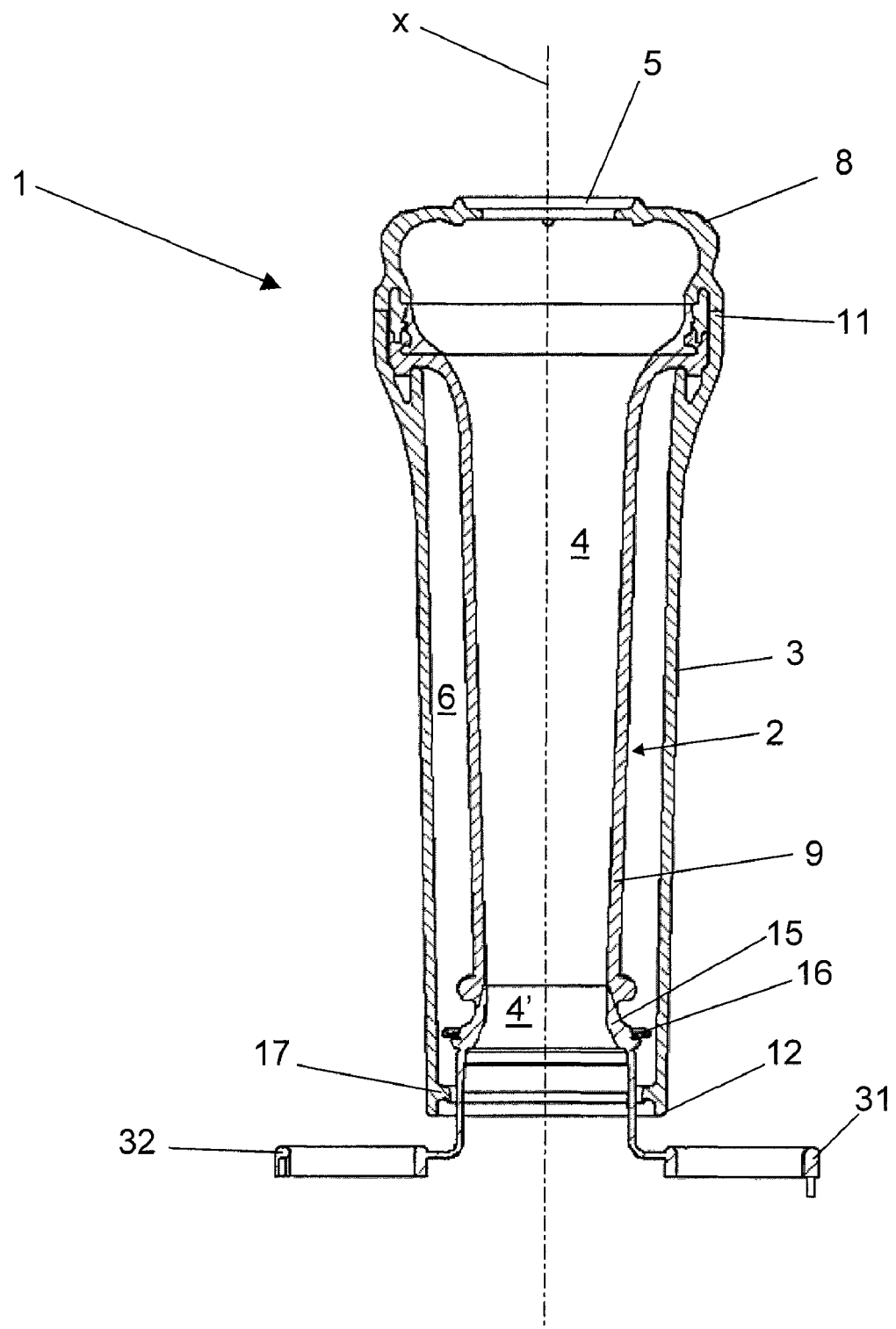

The present invention refers to a teatcup liner adapted to be mounted in a shell to form a teatcup to be applied to a teat of an animal in accordance with the pre-characterizing portion of claim 1. Such a teatcup liner is disclosed in WO2005/120216.

The invention also refers to a teatcup including a teatcup liner and a shell.

Teatcup liners are typically manufactured in a natural or synthetic rubber material. Rubber materials have many advantages connected to the elastic properties of rubber. These elastic properties are advantageous both during the manufacturing of the teatcup liner and during milking. The teatcup liner formed in a mould can easily be removed from the mould and the core shaping the inner space of the teatcup liner after the vulcanisation. However, the vulcanisation of the rubber requires a significant vulcanisation time before the rubber can be removed from the mould and the core. This is a limiting factor in the manufacturing of teatcup liners. It is desirable to be able to shorten the vulcanisation time. In WO2005/120216 mentioned above it is proposed to manufacture teatcup liners in a thermoformed material, i.e. Thermo Plastic Elastomers, TPE. By using such plastic materials, the manufacturing time needed can be significantly reduced.

However, TPE materials is somewhat less elastic than corresponding rubber materials. This means that when mounting the teatcup liner in a shell to form a teatcup, the force to be applied to the liner for pulling the liner to a proper engaged position in the shell will be rather high with TPE liners. In order to overcome this problem, WO2005/120216 proposes to include a disengageable grip member at the lower end of the teatcup liner. When mounting the teatcup liner, the grip member can be gripped by the operator who then pulls the teatcup liner to a proper position in the shell. However, such a pulling operation has to be performed a large number of times when the liners are to be replaced in many teatcups. It is therefore important that the grip member is a convenient tool which the operator easily may grip and which does not hurt the operator or lead to injures. EP-B-717 927 also discloses a teatcup liner having a terminal portion which can be gripped by the operator for pulling the teatcup liner to a proper position in the shell of the teatcup. The terminal portion can be cut of by means of a knife after the teatcup liner has been mounted in the shell.

SUMMARY OF THE INVENTION

The object of the present invention is to provide a teatcup liner having an improved grip member to be gripped by an operator.

This object is achieved by the teatcup liner initially defined and characterized in that the force application zone seen along the longitudinal centre axis is located within the cross-section area of the milk channel of the tubular lower portion. With such a force application zone the pulling force will be applied at a central position and substantially concentrically with the longitudinal centre axis of the liner. Such a concentration of the pulling force will provide a more efficient pulling of the liner through the shell and to final engagement therein.

According to an embodiment of the invention the grip member, during the mounting state, is adapted to be maneuvered by a pulling and/or rotating movement in relation to the shell in such a manner that the tubular barrel portion is stretched and the primary engagement member is engaged by the secondary engagement member. Such a pulling and/or rotating movement can easily be achieved by means of the grip member according to this invention. Advantageously, the force application zone is intersected by the longitudinal centre axis.

According to a further embodiment, the grip member extends from the tubular lower portion by means of at least two strips. Such strips may be flexible. Advantageously, the grip member comprises at least one grip element.

According to a further embodiment of the invention the grip element defines a grip in the form of an aperture. For instance, the grip element may comprise a ring, which forms such an aperture. Such a grip element having an aperture can easily be gripped and held by a finger of the operator for exerting the pulling force. The grip element may also have another shape, for instance the grip element may comprise a transversal rod defining a grip and a force application zone within the cross-section area. Advantageously, the grip element is connected to the tubular lower portion via a flexible strip.

According to a further embodiment of the invention, the grip member comprises two grip elements, which during the mounting state together define the force application zone and are arranged to be gripped simultaneously. By providing two grip elements, manufacturing is easier, and it is still possible to provide a force application zone within the cross-section area of the milk channel.

According to a further embodiment of the invention, each grip element seen along the longitudinal centre axis is movable from an inactive position outside the cross-section area to an active position within the cross-section area. Such a design of the grip elements is advantageous from a manufacturing point of view. A mould and a core for the moulding of the teatcup liner can then more easily be made than if the grip elements during the manufacturing would be located within the cross-section area of the milk channel of the tubular lower portion. Consequently, the grip elements can in the inactive position extend outside the cross-section area and outside the tubular lower portion and then be bent to the active position within the cross-section area when the teatcup liner is to be mounted, i.e. when the teatcup liner is introduced into the shell and moved therethrough, and then when the grip member is gripped before the final pulling of the teatcup liner to engagement in the shell.

According to a further embodiment of the invention, the grip member comprises a lock member permitting locking of the grip elements to each other, especially in the active position.

According to a further embodiment of the invention, the grip member is disengageable from the tubular lower portion when the teatcup liner has been mounted in the shell. Consequently, after engagement between the primary engagement member and the secondary engagement member the grip member may be disengaged from the teatcup in order not to interfere with other components of the teatcup and the milking equipment. More specifically, each grip element may be disengageable from the tubular lower portion when the teatcup liner has been mounted in the shell. Advantageously, the flexible strip may comprise a weakened portion enabling the grip element to be disengaged from the tubular lower portion. The weakened portion may be located immediately adjacent to the tubular lower portion.

According to a further embodiment of the invention, the primary engagement member is bendable towards the upper head portion. With such a bendable engagement member, the teatcup liner may be pulled in such a way that the primary engagement member passes over the secondary engagement member. The pulling resistance can be controlled or adapted by varying the bending resistance of the primary engagement member. Advantageously, a hindering member is arranged on the outer side of the tubular lower portion at a small distance from the primary engagement member, thereby rendering the primary engagement member less prone to bend away from the upper head portion then to bend towards the upper head portion. In such away introduction and pulling of the teatcup liner is facilitated whereas the removing is made more difficult so that the teatcup liner will be safely secured in the shell.

According to a further embodiment of the invention, the tubular barrel portion is manufactured in a first material, and the tubular lower portion and the grip member are manufactured in a second material, wherein the first material is more elastic than the second material. The second material of the tubular lower portion may be substantially permanently joined to the first material of the tubular barrel portion through a melting process. The primary engagement member and the hindering member may be manufactured in the second material. Preferably, the second material comprises polypropylene. Furthermore, the first material may comprise an elastic material such as TPE.

The object of the present invention is also achieved by a teatcup to be applied to a teat of an animal including a shell and a teatcup liner as defined above.

DETAILED DESCRIPTION OF THE DRAWINGS

The present invention is now to be explained more closely by the description of preferred embodiments and with reference to the drawings attached hereto.

FIG. 1 discloses a longitudinal sectional view of a teatcup comprising a teatcup liner according to the present invention.

Figure 2:
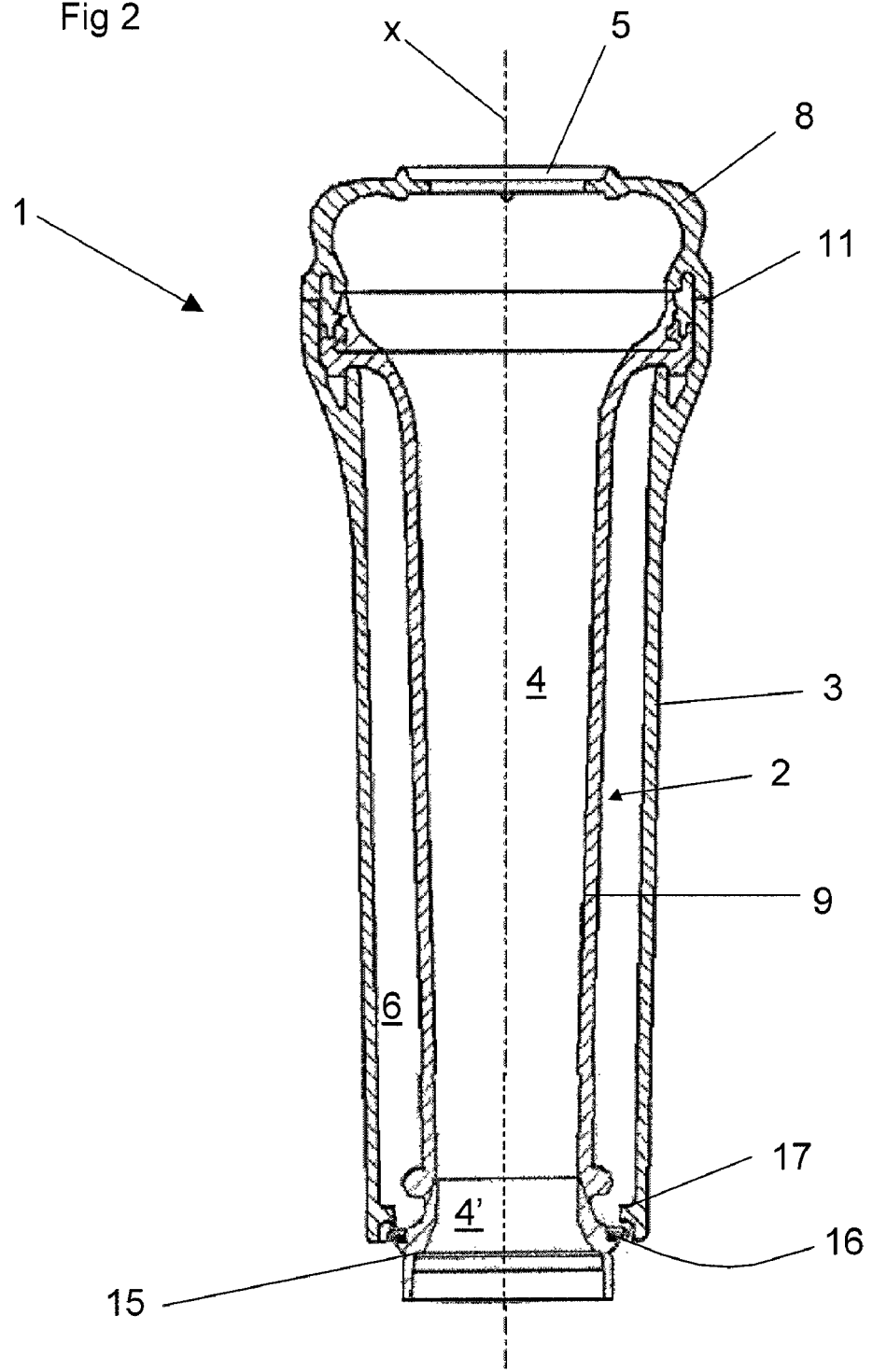

FIG. 2 discloses a longitudinal sectional view of the teatcup in FIG. 1 with the teatcup liner in a mounted state.

Figure 3:
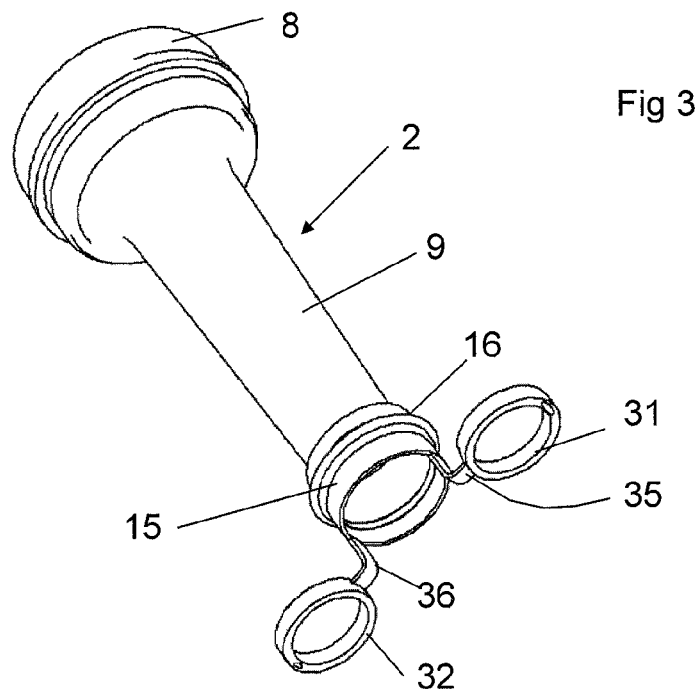

FIG. 3 discloses a perspective view from beneath of the teatcup liner in FIG. 1.

Figure 4:
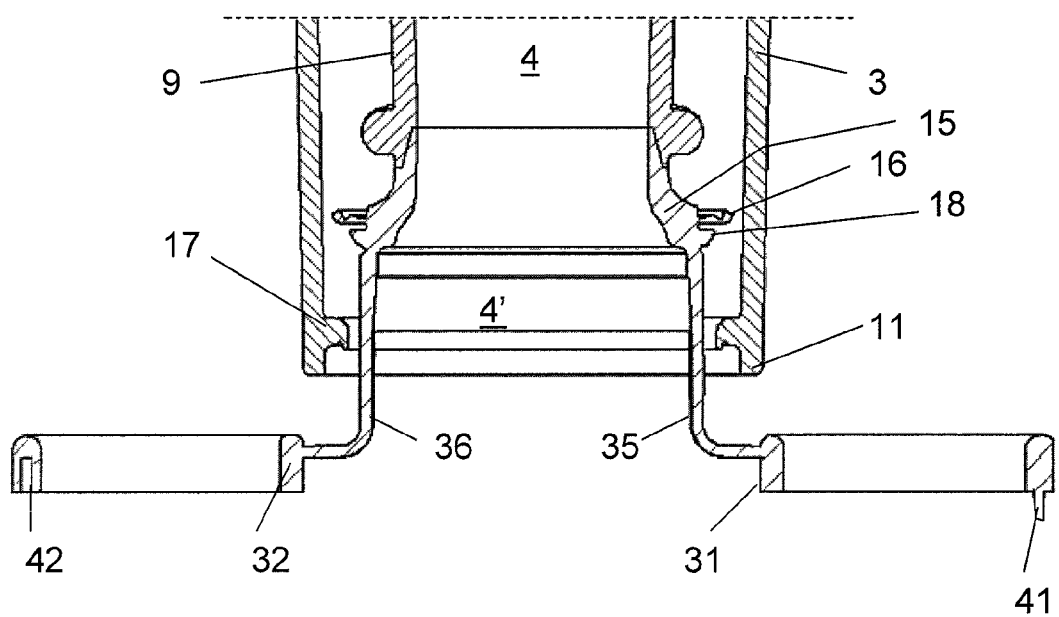

FIG. 4 discloses a sectional view of a lower part of the teatcup liner in FIG. 1. with a grip member in an inactive state.

Figure 5:
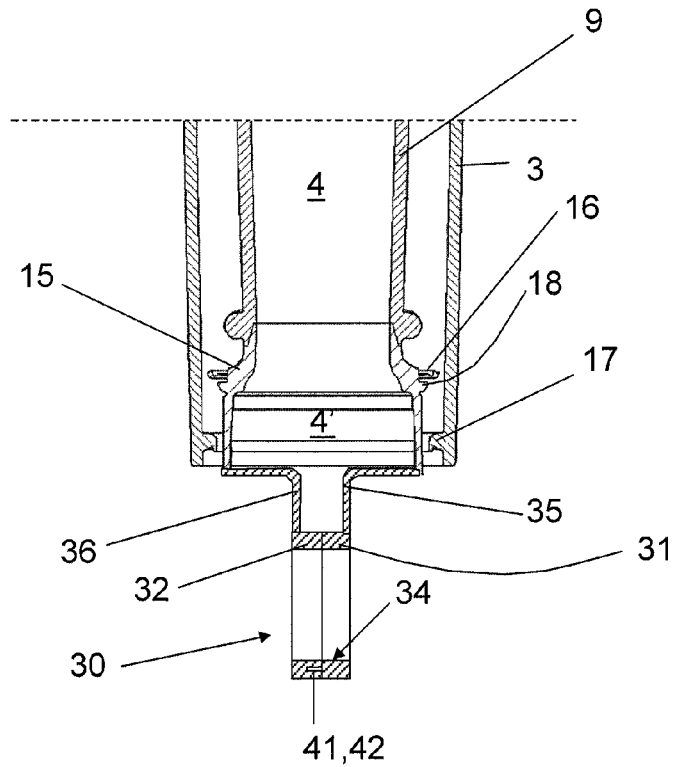

FIG. 5 discloses a sectional view of a lower part of the teatcup liner in FIG. 1 with the grip member in an active state.

Figure 6:
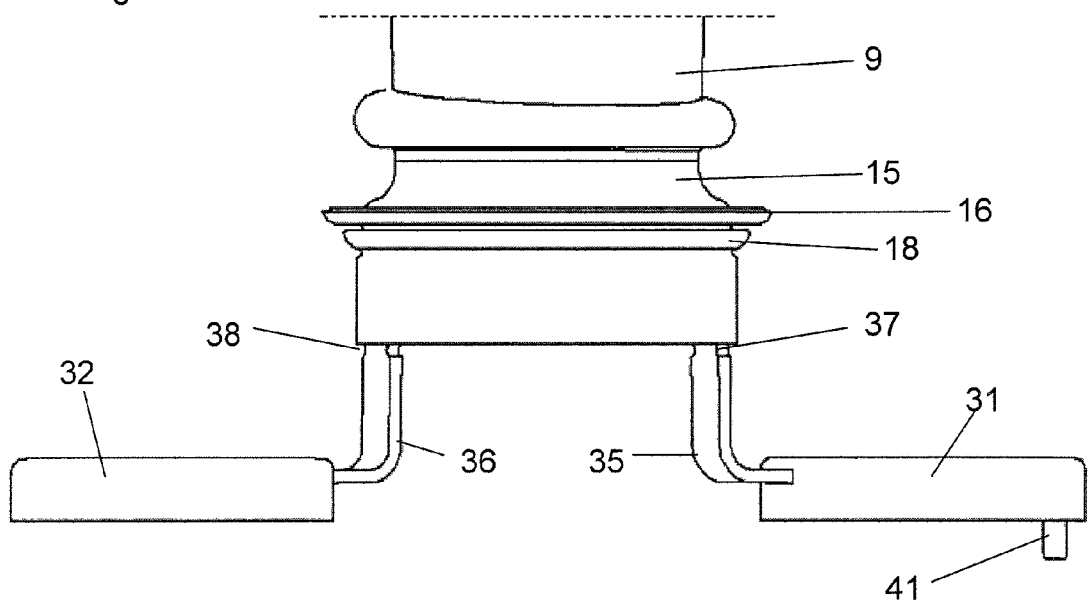

FIG. 6 discloses a side view of a lower part of the teatcup liner in FIG. 1 with the grip member in the inactive state.

Figure 7:
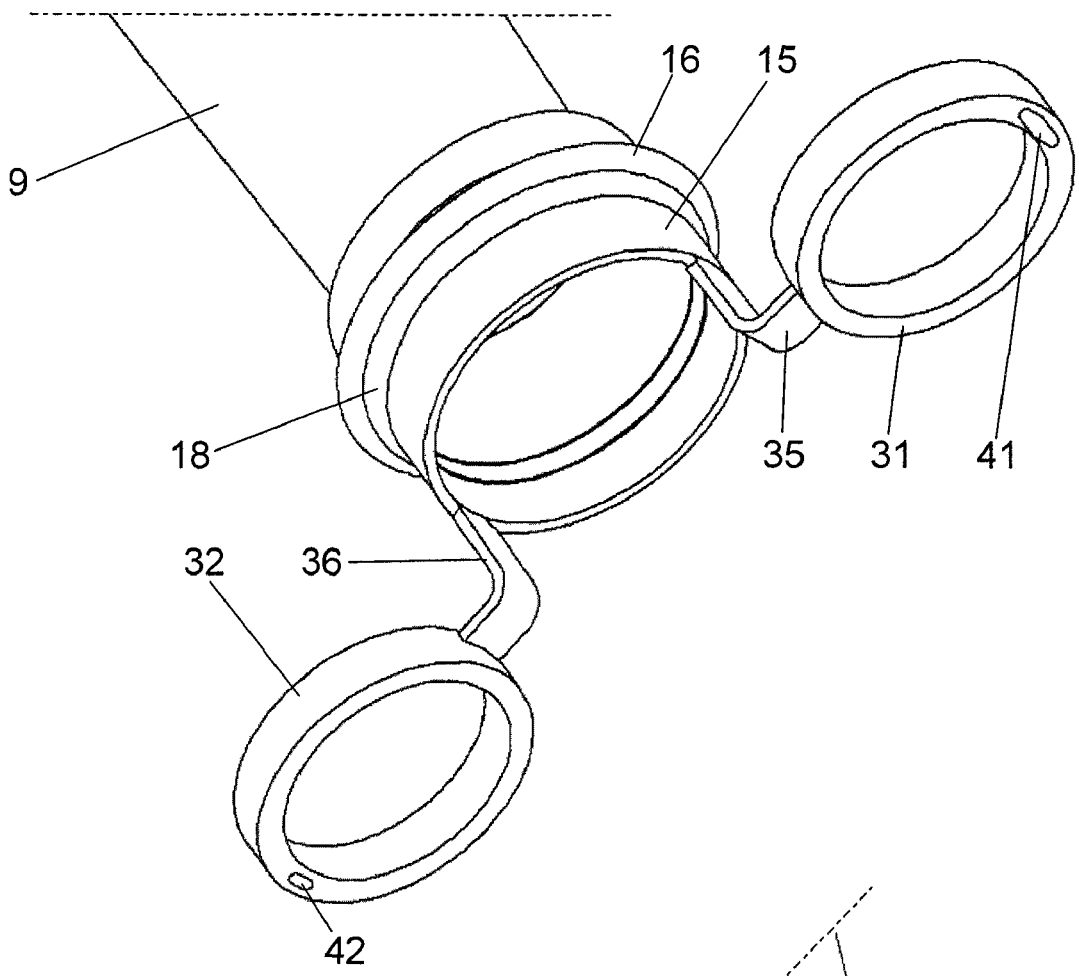

FIG. 7 discloses a perspective view of the lower part of the teatcup liner according to an embodiment with two grip elements shaped as rings.

Figure 8:
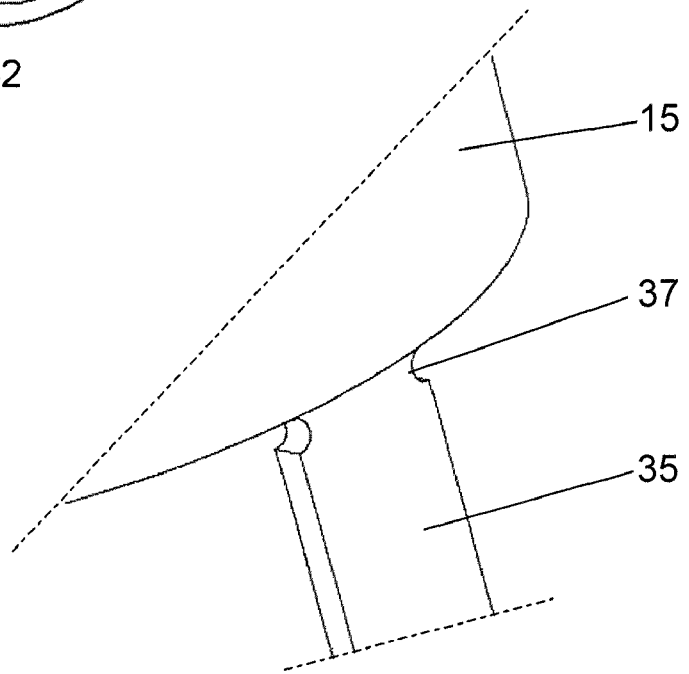

FIG. 8 discloses a perspective view of a part of a grip element of the teatcup liner in FIG. 1.

Figure 9:
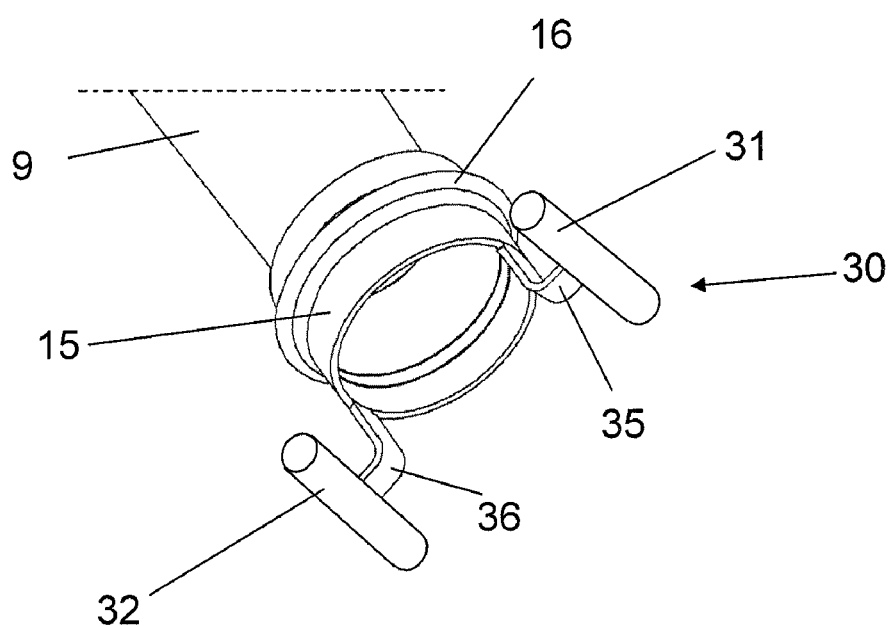

FIG. 9 discloses a perspective view of the lower part of the teatcup liner according to a further embodiment with two grip elements shaped as rods.

Figure 10:
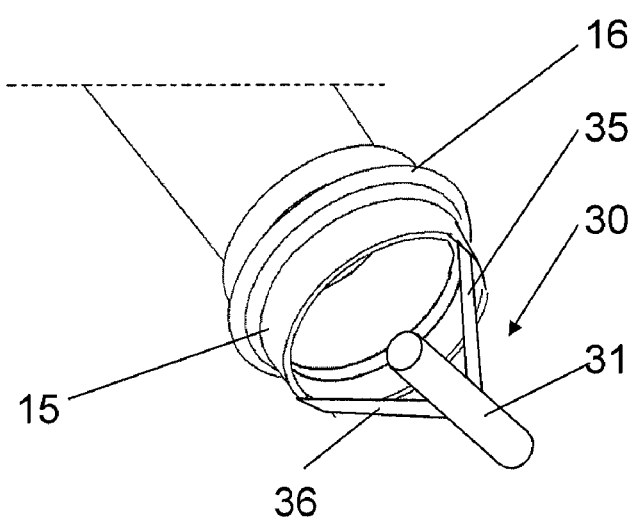

FIG. 10 discloses a perspective view of the lower part of the teatcup liner according to a further embodiment with one grip element shaped as a rod.

Figure 11:
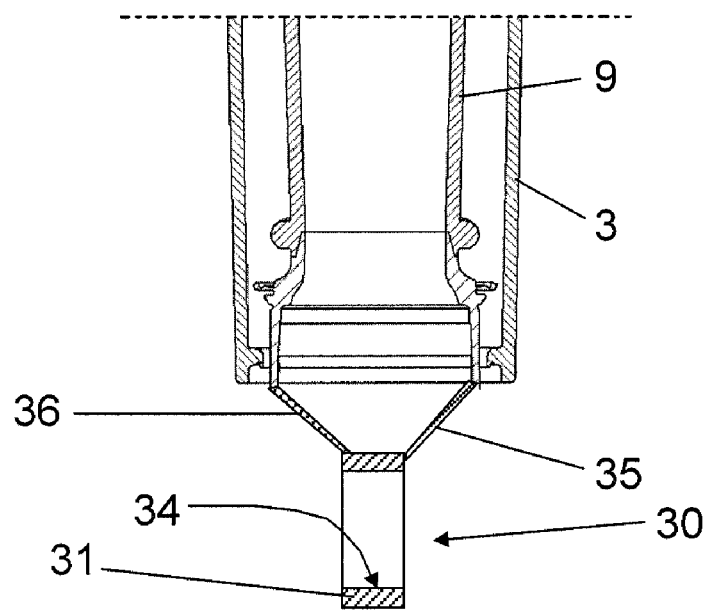

FIG. 11 discloses a perspective view of the lower part of the teatcup liner according to a further embodiment with one grip element shaped as a ring.

Figure 12:
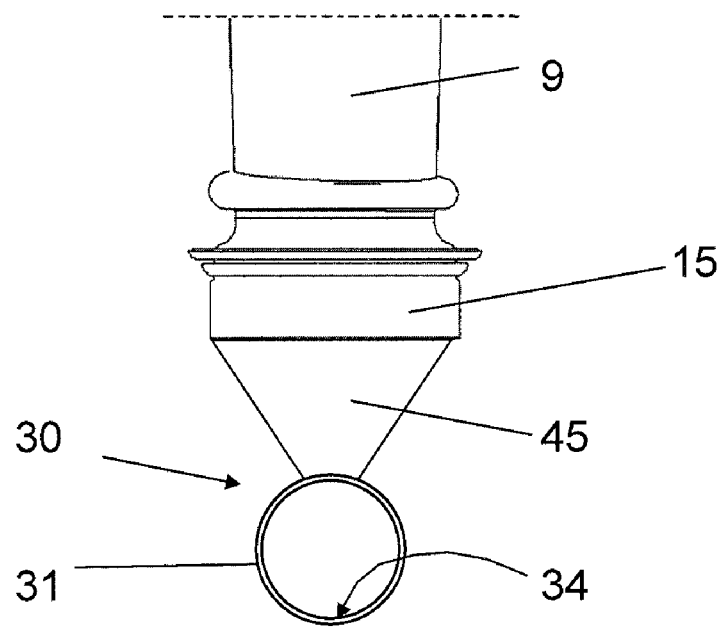

FIG. 12 discloses a perspective view of the lower part of the teatcup liner according to a further embodiment with one grip element shaped as a ring.

DETAILED DESCRIPTION OF VARIOUS EMBODIMENTS OF THE INVENTION

FIGS. 1 and 2 discloses a teatcup 1 comprising a teatcup liner 2 and a shell. FIG. 1 discloses the teatcup liner 2 introduced into the shell but not finally engaged therein. FIG. 2 discloses a mounted state, in which the teatcup liner 2 is engaged in the shell 3. The teatcup liner 2 includes an inner space 4 adapted to receive a teat of an animal to be milked. The teatcup liner 2 and the inner space 4 extends along a longitudinal centre axis x. A teat of an animal is introduced into the inner space 4 via an upper opening 5. A pulsation chamber 6 is formed between the shell 3 and the teatcup liner 2. The pulsation chamber 6 is accessible via an aperture, e.g. formed by a pipe nipple (not disclosed). In the mounted stated, the teatcup liner 2 comprises an upper head portion 8 and a lower tubular barrel portion 9 of the teatcup liner 2. The shell 3 has an upper end 11 and a lower end 12.

The head portion 8 and the tubular barrel portion 9 may be separate engaged parts. When the teatcup liner 2 is to be mounted in the shell 3, the tubular barrel portion 9 is introduced into the shell 3. The connection between the head portion 8 and the tubular barrel portion 9 is described more closely in WO2005/120216 which is referred to above.

Furthermore, the teatcup liner comprises a tubular lower portion 15 which extends from and forms a lower prolongation of the tubular barrel portion 9. The tubular lower portion 15 has a surrounding periphery defining a milk channel 4', which has a cross-section area seen along the longitudinal centre axis x and which forms a part of the inner space 4.

The tubular lower portion 15 comprises a primary engagement member 16 adapted to be in engagement with a secondary engagement member 17 on the inner wall surface of the shell 3. The primary engagement member 16 is bendable towards the head portion 8 so that the primary engagement member 16 can slide on and pass the secondary engagement member 17 when the teatcup liner 2 is pulled into engagement in the shell 3. A hindering member 18 is arranged on the outer side of the tubular lower portion 15, see FIGS. 4-6. The hindering member 18 is positioned at a small distance from the primary engagement member 16. The hindering member 18 is provided on the lower side of the primary engagement member 16, i.e. on the side of the primary engagement member 16 which is far from the head portion 8. Thanks to the hindering member 18, the primary engagement member 16 is less prone to bend away from the head portion 8 than to bend towards the head portion 8. The hindering member 18 has a smaller extension perpendicular to the longitudinal centre axis x than the primary engagement member 16. The distance between the primary engagement member 16 and the hindering member 18 in parallel to the longitudinal centre axis x is smaller than the extension of the primary engagement member 16 perpendicular to the longitudinal centre axis x. The primary engagement member 16 comprises a flexible ring extending from and surrounding the tubular lower portion 15. The hindering member 18 comprises a relatively rigid ring extending from and surrounding the tubular lower portion 15. The primary engagement member 16 and the hindering member 18 may be a respective integral part of the tubular lower portion 15.

The tubular barrel portion 9 is preferably manufactured in a first material comprising an elastic material, such as TPE, whereas the tubular lower portion 15 is manufactured in a second material being relatively rigid in comparison with the first material. The second material comprises, for instance, polypropylene. Consequently, the primary engagement member 16 and the hindering member 18 may both be manufactured in the second material. The second material of the tubular lower portion 15 is substantially permanently or permanently joined to the first material of the tubular barrel portion 9 through a melting process.

The teatcup liner 2 also comprises a grip member 30 extending from the tubular lower portion 15 and adapted to be griped by an operator, when the teatcup liner 2 is to be mounted in the shell 3. In the embodiment disclosed in FIGS. 1, 3-8, the grip member 30 comprises two grip elements 31, 32 which are movable from an inactive position, see FIG. 3 to an active position see FIG. 5. In the active position, the grip member 30 defines a force application zone 34 on which a pulling force is to be applied by the operator. The force application zone 34 is, seen along the longitudinal centre axis x, located within or inside the cross-section area of the milk channel 4' of the lower tubular portion 15.

When the teatcup liner 2, i.e. the tubular barrel portion 9 and the tubular lower portion 15 are introduced into the shell 3, the grip elements 31, 32 are bent from the inactive position shown in FIG. 3 to the active position shown in FIG. 5. When the teatcup liner 2 has reached the position shown in FIG. 1 the grip elements 31, 32 could again flex out to the inactive position due to their elasticity. From the position shown in FIGS. 1 and 4, the operator will move the grip elements 31, 32 to the active position and then exert a pulling and/or rotating movement onto the teatcup liner 2 in relation to the shell 3 in such a way that the tubular barrel portion 9 is stretched and the primary engagement member 16 is engaged by the secondary engagement member 17. In the active position, the grip member 30 will form the force application zone 34 so that it, as mentioned above, is located within the cross-section area of the milk channel of the tubular lower portion 15. In the inactive position, the grip elements 31, 32 will be located outside the cross-section area of the milk channel 4' of the tubular lower portion 15.

In the embodiment disclosed in FIGS. 1, 3-8, each grip element 31, 32 defines a grip in the form of at least one aperture. More precisely each grip element 31, 32 comprises a ring. It should be noted however, that the design of the grip elements 31, 32 may be modified. For instance, each grip element 31, 32 may define a grip in the form of at least one transversal rod, see the embodiment shown in FIG. 9. Also other shapes of the grip elements 31, 32 are possible. A grip element 31, 32 in the form of a ring is advantageous since it can be easily gripped by the operator by simply introducing a finger into the opening. Due to the relatively large area of the force application zone 34, a sufficient pulling force can be applied in a convenient manner by the operator.

It should also be noted that in case of a teatcup liner 2 which for any reason is difficult to bring to a proper engagement in the shell, the apertures of the grip elements 31, 32 also offers the possibility of introducing a rod or any similar element that could permit an even greater force to be applied. Furthermore, the grip member 30 may include merely one grip element in an active position, where the single grip element defines a force application zone located within the cross-section area of the milk channel of the tubular lower portion 15.

In the embodiment disclosed in FIGS. 1, 3-8, each grip element 31, 32 is connected to the tubular lower portion 15 via a respective flexible strip 35, 36. The flexible strips 35, 36 provide the flexibility permitting the grip elements 31, 32 to be moved from the inactive position to the active position and from the active position to the inactive position. In the embodiments disclosed, each flexible strip 35, 36 in the inactive position has an angled shape including a first leg, extending in parallel or substantially in parallel with the longitudinal centre axis x, and a second leg which is perpendicular or substantially perpendicular to the first leg. The flexibility providing the movability from the inactive position to the active position is in the embodiments disclosed located at a part immediately adjoining a lower edge of the tubular lower portion 15.

The grip member 30 is disengageable from the tubular lower portion 15 when the teatcup liner 2 has been mounted in the shell 3. More specifically, in the embodiments disclosed each grip element 31, 32 is disengageable from the tubular lower portion 15 when the teatcup liner 2 has been mounted in the shell 3. Such disengagement is facilitated by means of a weakened portion 37, 38 of each flexible strip 35, 36. The respective weakened portion 37, 38 is located immediately adjacent to the tubular lower portion 15 see FIGS. 6-8. The weakened portion 37, 38 also aids in providing the flexibility permitting the movability from the inactive position to the active position of the grip element 31, 32.

The grip member 30 also comprises a lock member by means of which the two grip elements 31, 32 can be locked together in the active position shown in FIG. 5. In the embodiment disclosed in FIGS. 1, 3-7, the lock member comprises a locking pin 41 arranged on one of the grip elements 31 and adapted to be introduced into a locking hole 42 on the other grip element 32, see in particular FIGS. 5-7. The locking pin 41 may advantageously have a slight wedge-like shape in order to permit a relatively firm locking of the two grip elements 31, 32 to each other. It should be noted that the lock member can be designed in many various ways. For instance a lock member including a hook arranged on one of the grip elements 31, 32 and adapted to enclose and/or grip the other grip element 32.

FIGS. 10, 11 and 12 disclose further embodiments of the grip member 30. In the embodiment disclosed in FIG. 10, the grip member 30 comprises a single grip element 31 in the form of a transversal rod. The grip element 31 is joined to the lower end of the lower tubular portion 15 by means of two strips 35, 36. Each strip 35, 36 may include a weakened portion as described above to permit easy disengagement of the grip member 30. In this embodiment, the teatcup liner is manufactured with the grip element 30 as shown in FIG. 10.

In the embodiment disclosed in FIG. 11, the grip member 30 comprises a single grip element 31 in the form of a ring. The grip element 31 is joined to the lower end of the lower tubular portion 15 by means of two strips 35, 36. Each strip may include a weakened portion as described above to permit easy disengagement of the grip member 30. In this embodiment, the teatcup liner is manufactured with the grip element 30 as shown in FIG. 11.

In the embodiment disclosed in FIG. 12, the grip member 30 comprises a single grip element 31 in the form of a ring. The grip element 31 is joined to the lower end of the lower tubular portion 15 by means of a conical continuous member 45. The conical member 45 may have a weakened portion extending around the periphery to permit easy disengagement of the grip member 30. In this embodiment, the teatcup liner is manufactured with the grip element 30 as shown in FIG. 12. It should be noted that the grip element 31 in the embodiment of FIG. 12 also may have another shape such as in the form of a rod.

The present invention is not limited to the embodiments disclosed but may be varied and modified within the scope of the following claims.

The invention claimed is:

1. A teatcup liner (2) adapted to be mounted in a shell (3) to form a teatcup (1) to be applied to a teat of an animal, the teatcup liner (2) defining an inner space (4) for receiving the teat and a longitudinal centre axis (x) extending through and along the inner space (4), the teatcup liner (2) comprising:

a head portion (8),
a tubular barrel portion (9), and
a tubular lower portion (15) defining a milk channel (4') having a cross-section area perpendicular to the longitudinal centre axis (x),
the tubular lower portion (15) having a primary engagement member (16) adapted to be in engagement with a secondary engagement member (17) of the shell (3) in a mounted state when the teatcup liner (2) is mounted in the shell (3),
the teatcup liner (2) also including a grip member (30) extending from the tubular lower portion (15) and adapted to be gripped by an operator during a mounting state when the teatcup liner (2) is to be mounted in the shell (3),
the grip member (30) defining during the mounting state a force application zone (34) on which a pulling force is to be applied, wherein the grip member (30) comprises two grip elements (31, 32), wherein each grip element seen along the longitudinal centre axis (x) is movable from an inactive position outside the cross-section area to an active position within the cross-section area,
wherein a force application zone (34) seen along the longitudinal centre axis (x) is located within the cross-section area of the milk channel (4') of the tubular lower portion (15).

2. A teacup liner according to claim 1, wherein the grip member (30), during the mounting state, is adapted to be manoeuvred by at least one of a pulling movement and a rotating movement in relation to the shell (3) in such a manner that the tubular barrel portion (9) is stretched and the primary engagement member (11) is engaged by the secondary engagement member (17).

3. A teatcup liner according to claim 1, wherein the force application zone (34) is intersected by the longitudinal centre axis (x).

4. A teatcup liner according to claim 1, wherein the grip member (30) extends from the tubular lower portion (15) by means of at least two strips (35, 36).

5. A teatcup liner according to claim 1, wherein the grip member (30) comprises at least one grip element (31, 32).

6. A teatcup liner according to claim 5, wherein the grip element (31, 32) defines a grip in the form of at least one aperture.

7. A teatcup liner according to claim 6, wherein the grip element (31, 32) comprises a ring.

8. A teatcup liner according to claim 5, wherein the grip element (31, 32) comprises a transversal rod.

9. A teatcup liner according to claim 5, wherein the grip element (31, 32) is connected to the tubular lower portion (15) via a flexible strip (35, 36).

10. A teatcup liner according to claim 1, wherein the two grip elements (31, 32), during the mounting state together provide the force application zone (34) and are arranged to be gripped simultaneously.

11. A teatcup liner according to claim 10, wherein the grip member (30) comprises a lock member (41, 42) permitting locking of the grip elements (31, 32) to each other.

12. A teatcup liner according to claim 1, wherein the grip member is disengageable from the tubular lower portion (15) when the teatcup liner (2) has been mounted in the shell (3).

13. A teatcup liner according to claim 12, wherein the grip member includes at least one element, which is disengageable from the tubular lower portion (15) when the teatcup liner (2) has been mounted in the shell (3).

14. A teatcup liner according to claim 13, wherein the grip element is connected to the tubular lower portion via a flexible strip (35, 36) which comprises a weakened portion (37, 38) enabling the grip element to be disengaged from the tubular lower portion (15).

15. A teatcup liner according to claim 14, wherein the weakened portion (37, 38) is located immediately adjacent to the tubular lower portion (15).

16. A teatcup liner according to claim 1, wherein the primary engagement member (16) is bendable towards the head portion (8).

17. A teatcup liner according to claim 16, wherein a hindering member (18) is arranged on the outer side of the tubular lower portion (15) at a small distance from the primary engagement member (16), thereby rendering the primary engagement member less prone to bend away from the head portion (8) than to bend towards the head portion (8).

18. A teatcup liner according to claim 17, wherein the tubular barrel portion (9) is manufactured in a first material, and the tubular lower portion (15) and the grip member (30) are manufactured in a second material, wherein the first material is more elastic than the second material.

19. A teatcup liner according to claim 18, wherein the primary engagement member (16) and the hindering member (18) are manufactured in the second material.

20. A teatcup liner according to claim 18, wherein the second material comprises polypropylene.

21. A teatcup liner according to claim 18, wherein the first material comprises an elastic material.

22. A teatcup to be applied to a teat of an animal, the teatcup comprising:
a shell (3); and
a teatcup liner (2),
the teatcup liner (2) adapted to be mounted in the shell (3), the teatcup liner (2) defining an inner space (4) for receiving the teat and a longitudinal center axis (x) extending through and along the inner space (4), the teatcup liner further comprising
a head portion (8),
a tubular barrel portion (9), and
a tubular lower portion (15) defining a milk channel (4') having a cross-section area perpendicular to the longitudinal centre axis (x),
the tubular lower portion (15) having a primary engagement member (16) adapted to be in engagement with a secondary engagement member (17) of the shell (3) in a mounted state when the teatcup liner (2) is mounted in the shell (3),
the teatcup liner (2) also including a grip member (30) extending from the tubular lower portion (15) and adapted to be gripped by an operator during a mounting state when the teatcup liner (2) is to be mounted in the shell (3),
the grip member (30) defining, during the mounting state of mounting the teatcup liner into the teatcup, a force application zone (34) on which a pulling force is to be applied by the operator, wherein the grip member (30) comprises two grip elements (31, 32), wherein each grip element seen along the longitudinal centre axis (x) is movable from an inactive position outside the cross-section area to an active position within the cross-section area,
wherein a force application zone (34), for the operator applying the pulling force, as seen along the longitudinal centre axis (x), is located within the cross-section area of the milk channel (4') of the tubular lower portion (15).

23. A teatcup liner according to claim 1, wherein the tubular barrel portion (9) is manufactured in a first material, and the tubular lower portion (15) and the grip member (30) are manufactured in a second material, wherein the first material is more elastic than the second material.

* * * * *